United States Patent
Chakrabarti et al.

(10) Patent No.: US 9,426,051 B2
(45) Date of Patent: Aug. 23, 2016

(54) METHOD AND APPARATUS FOR FACILITATING REMOTE HEALTH MONITORING OF A COMPUTERIZED HEALTHCARE SYSTEM

(71) Applicant: McKesson Financial Holdings, Hamilton (BM)

(72) Inventors: Robi Chakrabarti, Richmond (CA); Scott Allard, North Vancouver (CA); Todd Jensen, Muskego, WI (US)

(73) Assignee: McKesson Financial Holdings, Hamilton (BM)

( * ) Notice: Subject to any disclaimer, the term of this patent is extended or adjusted under 35 U.S.C. 154(b) by 385 days.

(21) Appl. No.: 13/835,902

(22) Filed: Mar. 15, 2013

(65) Prior Publication Data
US 2013/0246615 A1  Sep. 19, 2013

Related U.S. Application Data

(60) Provisional application No. 61/611,404, filed on Mar. 15, 2012.

(51) Int. Cl.
*G06F 15/173* (2006.01)
*H04L 12/26* (2006.01)
*H04L 29/08* (2006.01)

(52) U.S. Cl.
CPC .............. *H04L 43/10* (2013.01); *H04L 43/08* (2013.01); *H04L 67/125* (2013.01)

(58) Field of Classification Search
CPC ............ G06F 19/3418; G06F 19/3443; A61B 5/0024; H04L 67/12; A61M 2205/52; H04W 12/06; H04W 12/08; H04W 36/0005; H04W 36/32; H04W 36/34; H04W 48/02; H04W 48/04; H04W 48/18; H04W 4/003; H04W 4/046
USPC ....................................................... 709/224
See application file for complete search history.

(56) References Cited

U.S. PATENT DOCUMENTS

| | | | |
|---|---|---|---|
| 6,704,874 B1 * | 3/2004 | Porras et al. ..................... 726/22 |
| 8,214,497 B2 * | 7/2012 | Alperovitch et al. .......... 709/226 |
| 8,509,086 B2 * | 8/2013 | Anderson et al. .......... 370/236.1 |
| 8,528,077 B1 * | 9/2013 | Tidwell et al. .................. 726/22 |
| 8,887,175 B2 * | 11/2014 | Carey et al. .................... 719/318 |
| 8,894,576 B2 * | 11/2014 | Alwan et al. .................. 600/301 |
| 2004/0073453 A1 * | 4/2004 | Nenov et al. ...................... 705/2 |
| 2004/0244807 A1 * | 12/2004 | Sun et al. ....................... 128/904 |
| 2007/0118054 A1 * | 5/2007 | Pinhas et al. .................. 600/587 |
| 2008/0004904 A1 * | 1/2008 | Tran ................................. 705/2 |
| 2009/0240527 A1 * | 9/2009 | Bluth ............................... 705/3 |
| 2010/0056875 A1 * | 3/2010 | Schoenberg et al. ......... 600/300 |

(Continued)

*Primary Examiner* — Phuoc Nguyen
(74) *Attorney, Agent, or Firm* — Alston & Bird LLP

(57) ABSTRACT

A method, apparatus and computer program product are provided to facilitate the monitoring of the health of a plurality of computerized healthcare systems deployed at a plurality of different sites, such as at various healthcare facilities. In the context of a method, one or more sensor(s) may be identified that are to be downloaded and executed by a plurality of remote servers in order to provide for health monitoring of a computerized healthcare system. The method also receives the results of the health monitoring from the plurality of remote servers and determines a health score for the computerized healthcare system of a respective remote server based upon the results. The method may further cause a technician to be advised of the results and the healthcare score.

12 Claims, 4 Drawing Sheets

(56) References Cited

U.S. PATENT DOCUMENTS

2010/0169409 A1* 7/2010 Fallon et al. .................. 709/203
2010/0223581 A1* 9/2010 Manolescu et al. ........... 715/853
2012/0016911 A1* 1/2012 Schmidt ........................ 707/803
2012/0246297 A1* 9/2012 Shanker .............. H04L 67/2842
　　　　　　　　　　　　　　　　　　　　709/224

* cited by examiner

METHOD AND APPARATUS FOR FACILITATING REMOTE HEALTH MONITORING OF A COMPUTERIZED HEALTHCARE SYSTEM

CROSS REFERENCE TO RELATED APPLICATIONS

This application claims priority to U.S. Provisional Patent Application No. 61/611,404, filed Mar. 15, 2012, the entire contents of which are hereby incorporated by reference.

TECHNOLOGICAL FIELD

An example embodiment of the present invention relates generally to the monitoring of a computerized healthcare system in order to determine the health of the computerized healthcare system and, more particularly, to the remote monitoring of the health of a computerized healthcare system.

BACKGROUND

A variety of computerized healthcare systems are deployed and it is anticipated that many more will be deployed in the future. For example, computerized healthcare systems include medical imaging systems, radiology systems, cardiology systems and the like. These computerized healthcare systems support the practices of a number of healthcare providers and are oftentimes an integral part of the practice. By way of example, a medical imaging system provides for the capture, retention and analysis of various images of a patient and is referenced frequently by radiologists, physicians and other healthcare practitioners during the diagnosis and treatment of the patient. The computerized healthcare systems are commonly deployed at a large number of different sites, such as at various healthcare facilities, e.g., hospitals, physicians' offices, radiologists' offices or the like.

Because of the importance of the computerized healthcare systems to the practices of various healthcare practitioners, it is desired that the computerized healthcare systems remain operational and any unexpected outages or other disruptions are minimized. Because of the widely distributed nature of the computerized healthcare systems at a large number of healthcare facilities, it has been challenging and time-consuming to monitor the performance of the various computerized healthcare systems and to identify potential issues that might cause outages or other disruptions in the performance of the computerized healthcare systems.

BRIEF SUMMARY

A method, apparatus and computer program product are therefore provided according to an example embodiment in order to facilitate the monitoring of the health of a plurality of computerized healthcare systems deployed at a plurality of different sites, such as at various healthcare facilities. In one embodiment, the health of the plurality of computerized healthcare systems may be tested at the site of deployment, such as at the healthcare facility, and the results may be analyzed and action items defined at a remote location, thereby providing consistency relative to the analysis of the behavior of the computerized healthcare systems deployed at a plurality of different sites.

In one embodiment, a method is provided that identifies one or more sensor(s) to be downloaded and executed by a plurality of remote servers in order to provide for health monitoring of a computerized healthcare system. The method of this embodiment also receives the results of the health monitoring from the plurality of remote servers and determines a health score for the computerized healthcare system of a respective remote server based upon the results. In this embodiment, the method also causes a technician to be advised of the results and the healthcare score. In another embodiment, an apparatus comprising processing circuitry configured to perform comparable functionality is provided. In a further embodiment, a computer program product including at least one non-transitory computer-readable storage medium having computer-executable program code instructions stored therein that include program code instructions configured to perform comparable functionality is also provided.

In another embodiment, a method is provided that includes identifying one or more sensors that are to be deployed and downloading the one or more sensors. The method of this embodiment also executes the one or more sensors in accordance with a predefined schedule in order to provide for health monitoring of a computerized healthcare system. In this embodiment, the method causes the results of the health monitoring to be provided to a remote server for analysis and then repeats the identifying, downloading, executing and causing steps to permit additional sensors to be deployed. In another embodiment, an apparatus comprising processing circuitry configured to perform comparable functionality is provided. In a further embodiment, a computer program product including at least one non-transitory computer-readable storage medium having computer-executable program code instructions stored therein that include program code instructions configured to perform comparable functionality is also provided.

BRIEF DESCRIPTION OF THE DRAWINGS

Figure 1:
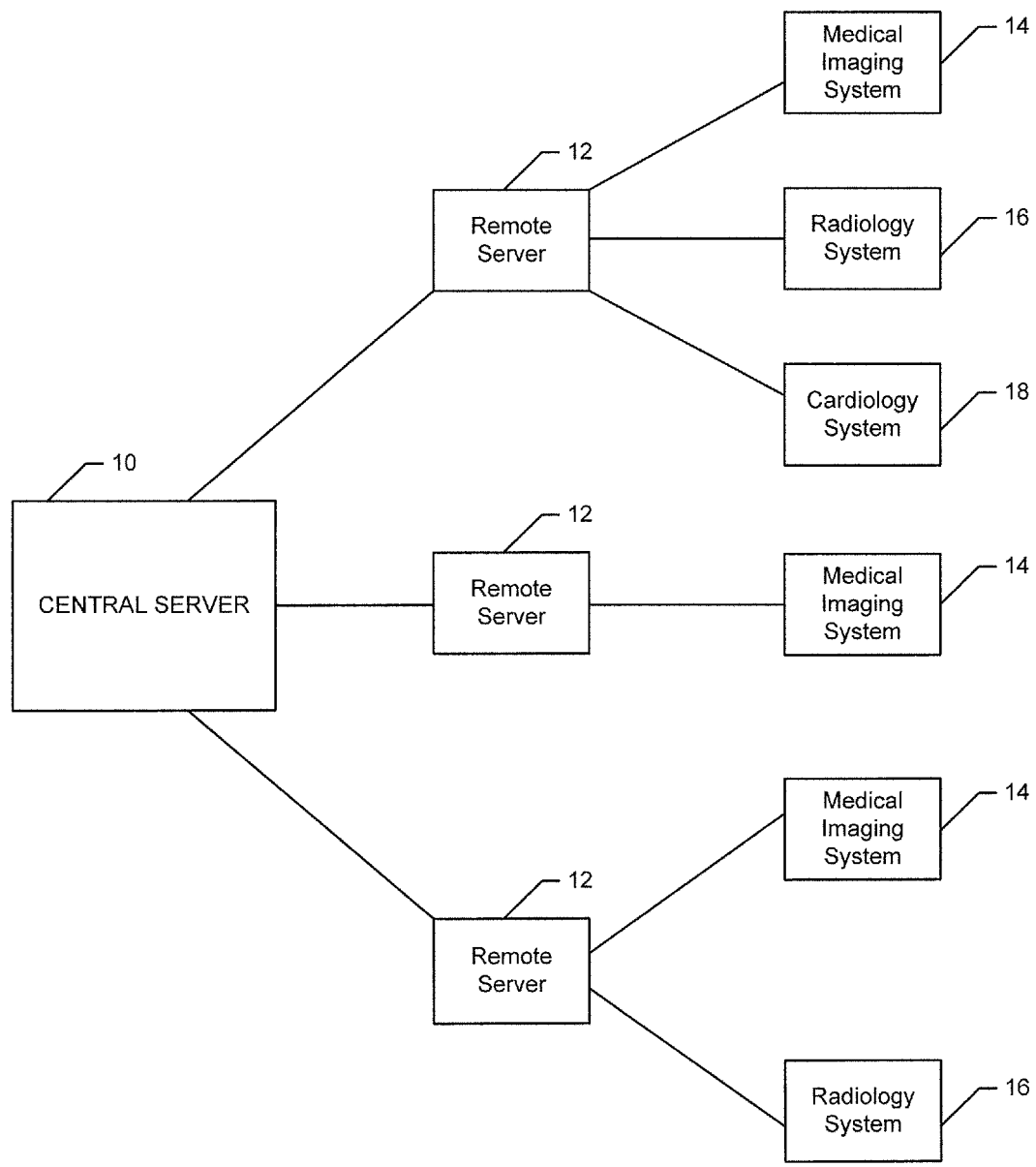
Figure 2:
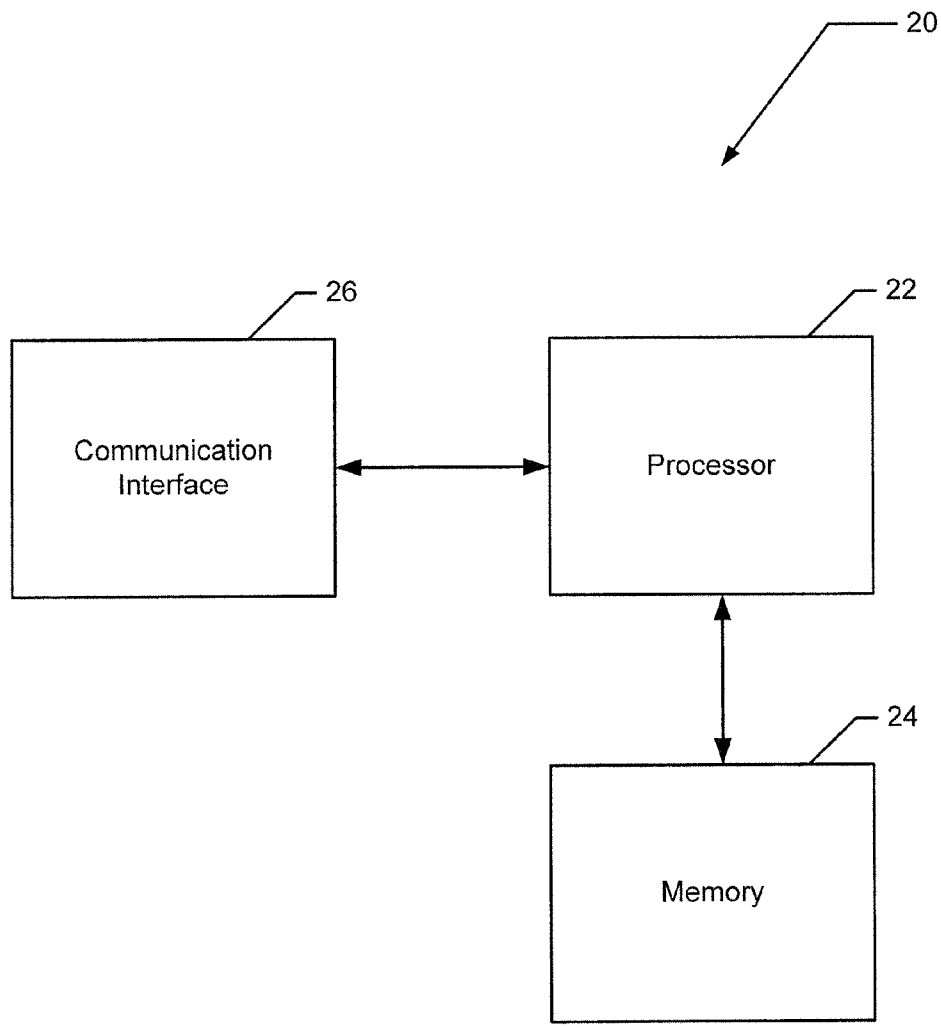
Figure 3:
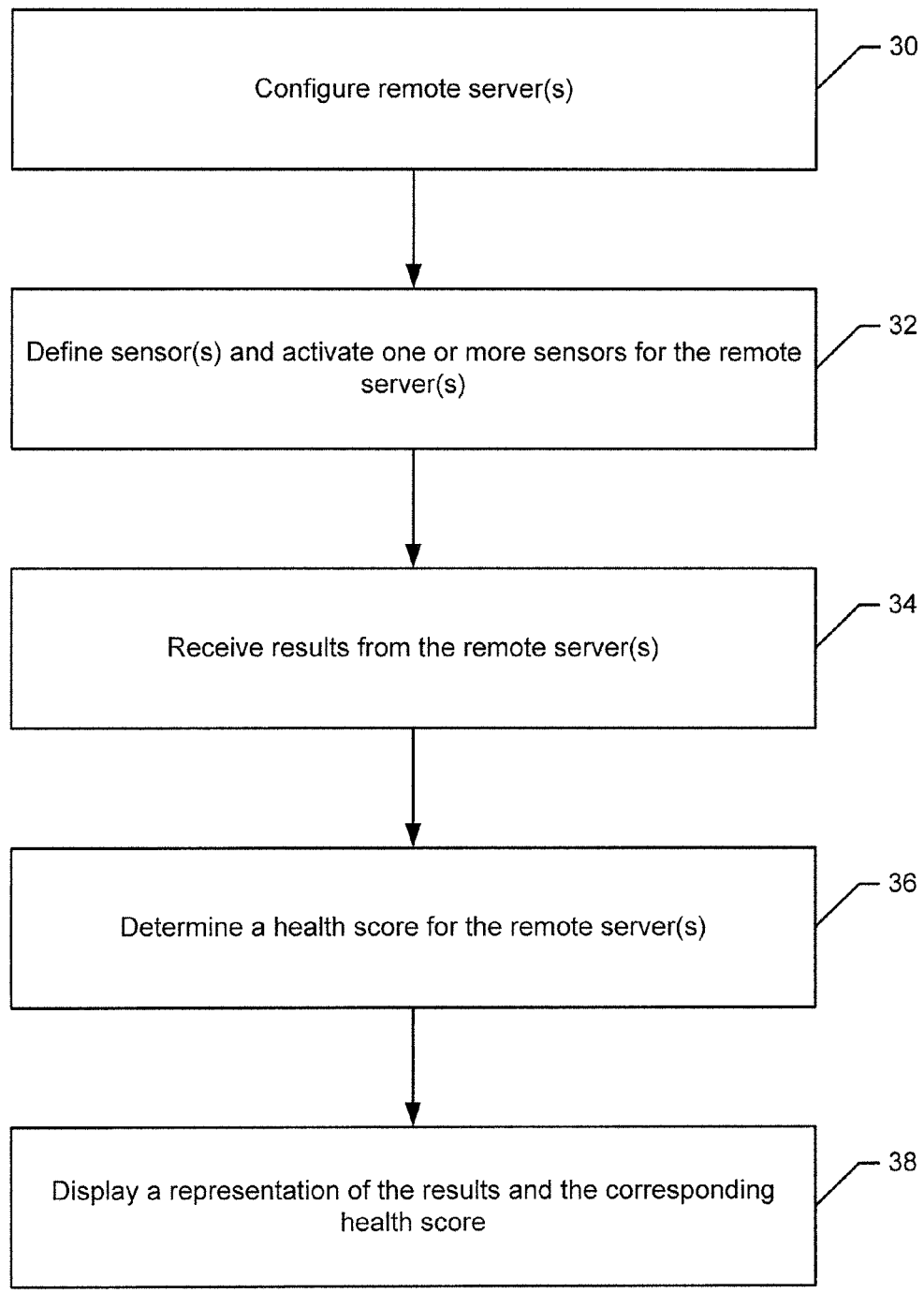
Figure 4:
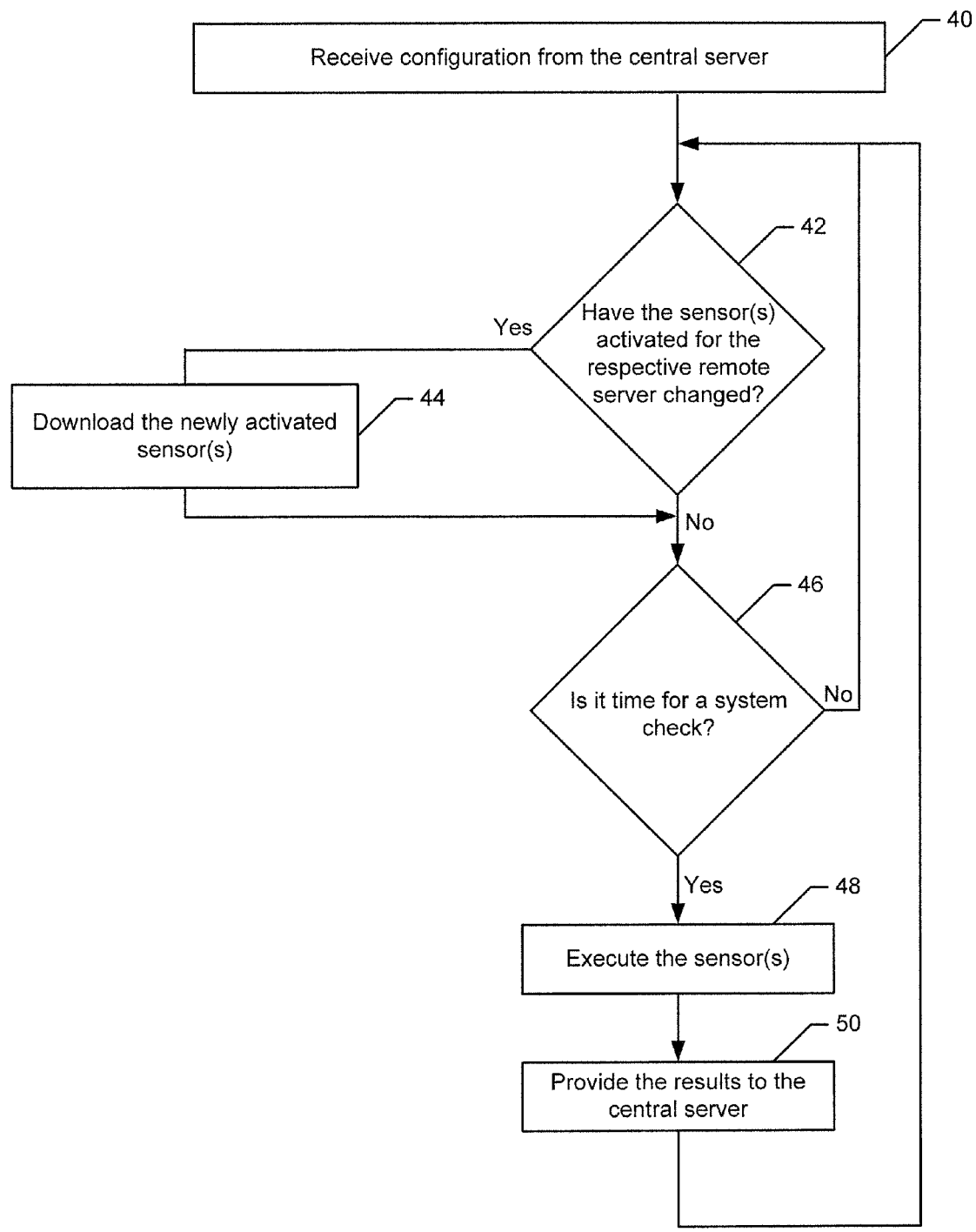

Having thus described certain embodiments of the invention in general terms, reference will now be made to the accompanying drawings, which are not necessarily drawn to scale, and wherein:

FIG. 1 is a block diagram of a system including a central server and a plurality of remote servers supporting a plurality of computerized healthcare systems with the central server and the remote servers capable of being specifically configured in accordance with an example embodiment of the present invention;

FIG. 2 is a block diagram of an apparatus that may be embodied by or otherwise included within a central server or a remote server and may be specifically configured in accordance with an example embodiment of the present invention;

FIG. 3 is a flow chart illustrating the operations performed by an apparatus embodied by or otherwise included within a central server in accordance with an example embodiment of the present invention; and FIG. 4 is a flow chart illustrating the operations performed by an apparatus embodied by or otherwise included within a remote server in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a system that may provide for the health monitoring of a plurality of computerized healthcare systems deployed at a plurality of different sites is illustrated. In this regard, the system may include a central server 10 and a plurality of remote servers 12 in communication with the central server, such as via a wireless connection or a wireline connection. The central server may be co-located with one of the remote servers or may be remote from all of the remote servers as shown in FIG. 1. The remote servers are generally located at different sites, such as at different healthcare facilities. In this regard, the remote servers may be located at a variety of different types of healthcare facilities including hospitals, physicians' offices, radiologists' offices, cardiologists' offices or the like.

Each remote server 12 may, in turn, be configured to be in communication with and correspondingly monitor one or more computerized healthcare systems. A remote server may be in communication with and therefore monitor a variety of different types of computerized healthcare systems including imaging systems that are deployed by the respective healthcare facility. In one embodiment, the computerized healthcare systems include medical imaging systems 14, such as a Horizon Medical Imaging system, a radiology system 16, such as the McKesson Radiology Manager, and a cardiology system 18, such as a Horizon Cardiology system. More generally, the computerized healthcare systems include computerized systems configured to support the practice of a healthcare practitioner in conjunction with the diagnosis and treatment of a patient. As shown by way of example in FIG. 1, the healthcare facilities at which the remote servers are located may include different numbers and different types of computerized healthcare systems such that the remote servers, in turn, are in communication with and therefore monitor different types and different numbers of computerized healthcare systems.

The central server 10 and the remote servers 12 may each embody or otherwise be associated with a computing device 20 that is generally depicted in FIG. 2 and that may be configured to perform various operations in accordance with an example embodiment of the present invention as described below, such as in conjunction with FIG. 3 from the perspective of the central server and FIG. 4 from the perspective of a remote server. However, it should be noted that some embodiments may include further or different components, devices or elements beyond those shown and described herein, such as a user interface.

As shown in FIG. 2, the computing device 20 may include or otherwise be in communication with a processing system including, for example, processing circuitry that is configurable to perform actions in accordance with example embodiments described herein. The processing circuitry may be configured to perform data processing, application execution and/or other processing and management services. The processing circuitry may include a processor 22 and memory 24 that may be in communication with or otherwise control a communication interface 26.

The communication interface 26 may include one or more interface mechanisms for enabling communication with other devices, such as the remote servers 12 in the context of the central server 10, or the central server in the context of a remote server. In this regard, the communication interface may include, for example, an antenna (or multiple antennas) and supporting hardware and/or software for enabling the communications, such as secure communications as noted above.

In an example embodiment, the memory 24 may include one or more non-transitory memory devices such as, for example, volatile and/or non-volatile memory that may be either fixed or removable. The memory may be configured to store information, data, applications, instructions or the like for enabling the computing device 20 to carry out various functions in accordance with example embodiments of the present invention. For example, the memory could be configured to buffer input data for processing by the processor 22. Additionally or alternatively, the memory could be configured to store instructions for execution by the processor. Among the contents of the memory, sensors may be stored for execution by the processor in order to carry out the functionality associated with each respective sensor, as described below.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted above, FIGS. 3 and 4 are flowcharts illustrating the operations performed by a method, apparatus and computer program product, such as computing device 20 of FIG. 2, from the perspective of the central server 10 and a remote server 12, respectively, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 24 of a computing device employing an embodiment of the present invention and executed by a processor 22 of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3 and 4, when executed, convert a computer or processing circuitry into a particular machine configured to perform an example embodiment of the present invention. Accordingly, the operations of FIGS. 3 and 4 define an algorithm for configuring a computer or processing circuitry, e.g., processor, to perform an example embodiment. In some cases, a general purpose computer may be provided with an instance of the processor which performs the algorithm of FIGS. 3 and 4 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Referring now to FIG. 3, the operations performed by the computing device 20 embodied by the central server 10 are illustrated. As shown, the central server, such as the processor 22 of the computing device, may initially configure one or more remote servers. See block 30 of FIG. 3. In this regard, the central server may define a configuration file for a respective remote server 12 that defines a plurality of its operational characteristics, such as the schedule according to which the remote server will monitor the computerized healthcare system, the manner in which the remote server will communicate with the central server and the like. In regards to the communication between the central server and the remote server, the communications may be conducted via a secure connection, such as via a hypertext transport protocol secure (HTTPS) using 256 bit encrypted secure sockets layer (SSL) verified by a VeriSign certificate.

As shown in block 32 of FIG. 3, the computing device 20 embodied by the central server 10, such as the processor 22, may also define one or more sensors and may activate one or more of the sensors in regards to a respective remote server 12. In this regard, a sensor generally defines a particular health monitoring or information gathering activity to be performed by the remote server. As such, the sensor may be defined by a script or other computer program module and may be downloaded by and executed by the remote server in order to perform the desired health monitoring function. In this regard, the health monitoring relates to the monitoring of one or more characteristics or parameters, e.g., operational characteristics, parameters or other system metrics, that are indicative or otherwise informative regarding the ongoing operations or functioning of the computerized healthcare system, as opposed to the monitoring of a condition of a patient.

Each sensor may define any of a wide variety of different health monitoring routines to be performed. For example, the sensors may simply measure a value and then provide that value in response. Alternatively, the sensors may make a determination and then provide a response indicative of the results of the determination. Still further, the sensors may be more complex and may require one or more of a series of measurements or other monitoring activities to be performed followed by an analysis that is performed by the remote server prior to providing a result based upon the analysis. By way of example, one sensor may determine if each of the servers that support the operations of the respective computerized healthcare systems are online and functioning properly. Another sensor may determine if there remains sufficient storage space, such as for the storage of additional images with the sufficiency of the remaining space being based upon a predefined threshold.

Other examples of sensors include a sensor configured to determine the storage space available on a disk, such as the space available in the main partition and/or the space available in a local image cache, which should exceed a predefined threshold in a healthy system. Another sensor may determine the number of unarchived studies, which should be below a predefined threshold in a healthy system. Another sensor utilized for Health Insurance Portability and Accountability Act (HIPAA) auditing may determine the number of processes running and/or the log space available. Another sensor may determine if all clocks in the servers and other workstations associated with the remote server are within a predefined time increment, e.g., 5 minutes of one another. Another sensor provides for a database consistency check. A further sensor may determine if scheduled database backups have been performed and, if so, if they were successful. Yet another sensor may determine the number of workstations executing an event log for HIPAA monitoring. Another sensor may determine the virus definition dates of the anti-virus applications, while yet another sensor may verify that voice clips, scanned documents and other binary large objects (BLOBs) have been properly backed up in an archive. Another sensor may determine if configuration parameters have been set in a manner that could lead to future issues. A further sensor may insure that the log size of an Oracle Listener log is less than a predefined threshold, e.g., 1 GB. Another sensor may detect if the size of a database is not being extended even if the size is auto-extensible. A further sensor may determine that studies are linked to modality sources. Yet another sensor may determine if the outbound connections, such as the connection to the central server, are available. The foregoing sensors are provided by way of example and other or different sensors may be provided in other embodiments.

The computing device 20 embodied by the central server 10 may define the same or different sensors for each of the remote servers 12. In an instance in which the sensors are different, the sensors designed for a respective remote server may differ, either entirely or in terms of one or more of the sensors, from the sensors designed for other remote servers. In order to allow the remote server to download the appropriate sensors, the computing device embodied by the central server may activate or deactivate a respective sensor with respect to a respective remote server. Thus, as described below, a remote server may query the computing device embodied by the central server to determine the sensors that have been activated for the respective remote server and may then download any sensors that have been activated for the respective remote server that have not already previously been downloaded by the remote server. In addition to merely activating the sensors, the computing device embodied by the central server may define a time at which the sensor is to become active or a time window within which the sensor is to be active. In addition, a schedule may be associated with a respective sensor indicating the timing at which the sensor is to be executed, such as daily, weekly, monthly, etc. In one embodiment, the computing device embodied by the central server may define the number of times that the sensor is to be executed prior to being disabled, such as one time or an unlimited number of times.

The computing device 20 embodied by the central server 10, such as the processor 22 or the communication interface 26, may also receive the results from the remote servers 12 following the execution of the sensors. See block 34 of FIG. 3. In this regard, following the execution of the sensors, such as in accordance with the predefined schedule established for the respective remote server, a remote server may report the results from each of the sensors that have been activated for the respective remote server to the computing device embodied by the respective central server. The computing device embodied by the central server, such as the processor, may then optionally conduct further analysis of the results, either individually with respect to the remote server that provided the results or collectively in combination with the results provided by other remote servers. For example, the computing device embodied by the central server may identify trends from the results provided by a plurality of remote servers. Depending upon the results provided by the respective server, the computing device embodied by the central server, such as the processor, may also provide a representation of the results to a user, such as a technician responsible for the maintenance and operation of the computerized healthcare systems supported by the remote server that provides the results. See block 38 of FIG. 3. This representation may be in the form of a display, such as the dashboard, providing an indication of the results and flagging any results that are outside of predefined acceptable bounds. The computing device embodied by the central server may also provide various alerts or alarms to the user in an instance in which the result failed to satisfy predefined acceptable bounds. In order to provide the representation of the results to the user, the computing device embodied by the central server may include a user interface, such as a display, and/or the central server may be in communication with a workstation that includes a user interface, e.g., a display, for providing a representation of the results.

The computing device 20 embodied by the central server 10, such as the processor 22, may also determine a health score for each respective remote server based upon the results provided by the respective remote server. See block 36 of FIG. 3. In this regard, for each type of result, a plurality of candidate states may be defined that may, for example, be indicative of different levels of severity. While a variety of different states may be utilized in the various embodiments, the computing device embodied by the central server of one embodiment may categorize the results provided by a respective remote server as pass, not run, unknown, warning or failure. In regards to a pass state, the result returned by the respective remote server satisfies a first predefined criteria indicative of a computerized healthcare system being in a healthy state. The not run state will indicate that the corresponding sensor was not executed. An unknown state will indicate that the result provided by the respective remote server is unknown or is unable to be properly categorized. The warning state indicates that the result returned by the respective remote server fails to satisfy the first predefined criteria, but satisfies a second predefined criteria that defines the boundary between the warning state and the failure state. As such, the states of this example embodiment define three different categories of results that are recognized by the computing device of the central server including the pass state in which the results are indicative of a healthy computerized healthcare system, a warning state in which the results are indicative of a computerized healthcare system that does not appear to be fully healthy and that may merit maintenance or review but has not yet failed, and a failure state in which operations of a computerized healthcare system have failed.

The computing device 20 embodied by the central server 10, such as the processor 22, may assign a different health score to each category, such as a score of 0 for pass state, a score of 1000 for warning state and a score of 10000 for a failure state. Although the health score assigned for each result may have the same predetermined health scores associated with the pass, warning and failure states in one embodiment, different health scores may be associated with the pass, warning and failure states of different ones of the results in other embodiments. The computing device embodied by the central server, such as the processor, may then determine the sum of the health scores associated with each of the results provided by a respective remote server and may then compare the sum of the health scores with predefined thresholds indicative of a computerized healthcare system being healthy, requiring maintenance, being unstable or being critical. By way of example, health scores of 49 or less may be considered healthy, health scores of 50 to 999 may be considered in need of maintenance, health scores between 1,000 and 9,999 may be considered unstable and health scores that equal or exceed 10,000 may be considered critical. Based upon the respective health scores, a user, such as a technician, may prioritize the maintenance activities associated with a respective remote server and the computerized healthcare system supported thereby in an informed manner.

In one embodiment, the computing device 20 embodied by the central server 10, such as the processor 22, may receive input from a user, such as a technician, indicating that the technician is aware of and working to resolve an issue that causes a particular result to be classified in either the warning state or the failure state. In this embodiment, the computing device embodied by the central server, such as the processor, of one embodiment may not assign a health score to the respective result that is commensurate with the warning state or the failure state, but may, instead, assign a different, e.g., lower, score based upon the knowledge that a technician is aware of and is working to resolve the issue underlying the result. For example, a result that otherwise would have fallen within the warning state and triggered a health score of 1000 may, instead have a health score of 50 in an instance in which the computing device embodied by the central server also receives an indication that a technician is aware of and working to resolve the issue underlying the particular result.

As described above, the process of defining sensors and activating various ones of the sensors for respective remote servers 12 may be an ongoing process. Thus, computing device 20 embodied by the central server 10, such as the processor 22, may define additional or different sensors and may activate a different combination of sensors for a respective remote server in order to measure different or additional aspects of the health of a respective computerized healthcare system. As described below, the respective remote server may then download the newly-defined sensors that are activated for the respective remote server and subsequently provide results based thereupon for inclusion in the corresponding health score.

Additionally, the computing device 20 embodied by the central server 10, such as the processor 22 or the communication interface 26, may provide for reconfiguration of respective ones of the remote servers 12, if so desired. In this embodiment, a new configuration file may be downloaded to a respective remote server in order to change its operational performance, such as by changing the schedule at which the remote server operates, changing the manner in which the remote server communicates with the central server or the like.

From the perspective of a remote server 12 and as shown in block 40 of FIG. 4, a computing device 20 embodied by the remote server, such as a task engine executed by the processor 22 (hereinafter generally referenced as the processor in conjunction with the operations of the remote server) or the communication interface 26, may initially receive its configuration, such as a configuration file, from the central server 10. This configuration information defines the at least some of the operational characteristics of the remote server in regards to the health monitoring of one or more computerized healthcare monitoring systems including, for example, the schedule via which the remote server will execute the sensors and provide the results, the manner in which the remote server will communicate with the central server or the like. In one embodiment, the remote server may then enter a sleep mode, at least relative to communication with the central server, and may awake and communicate with the central server in accordance with a predefined schedule. In this regard, upon awakening, the remote server may communicate with the central server in order to determine the sensors that have been activated for the respective remote server. In this regard, the apparatus embodied by the remote server, such as the processor or the communication interface, may determine if the sensors that are activated for the remote server have changed, such as by the addition of a different sensor or the modification of an existing sensor, since the prior review of the activated sensors by the remote server. See block 42. In an instance in which a different sensor has been activated or an existing sensor has been modified, the apparatus embodied by the remote server, such as the processor or the communication interface, may download the newly activated sensor. See block 44.

Additionally, the apparatus 20 embodied by the remote server 12, such as the processor 22 or the communication interface 26, may determine if it is time to execute the sensors in order to check the health of the computerized healthcare systems. See block 46 of FIG. 4. In this regard, a predefined schedule in regards to the execution of the sensors may be downloaded to the remote server, such as a part of the configuration file. In an instance in which it is not yet time to execute the sensors to evaluate the health of the computerized healthcare systems, the remote server may again enter the sleep mode with respect to communications with the central server 10. When, however, it is time to execute the sensors in order to monitor the health of the computerized healthcare systems, the computing device embodied by the remote server, such as the processor and/or the communication interface, may execute the sensors and may, in turn, provide the results to the central server. See blocks 48 and 50 of FIG. 4.

In some instances, the remote server 12 may simply provide the results of the execution of a sensor to the central server 10 for further analysis. However, in other embodiments, the computing device 20 embodied by the remote server, such as the processor 22, may further process the results provided by execution of a sensor and then return the results of this further processing to the central server for review and optionally further analysis. By way of example, a sensor may measure the time between an examination of a patient and the creation of a report regarding the examination. This sensor may also monitor the manner in which the report is created, such as by dictation or by data entry at a workstation. In this regard, the execution of the sensor may identify the time of each of a plurality of different patient examinations, the time of the creation of each of a plurality of reports for each respective examination and the manner in which each of the reports is created. Instead of providing all of this data to the central server, the computing device embodied by the remote server may determine an average time between a patient examination and the creation of a report for the respective patient for each of the different manners in which the reports are generated and then provide these cumulative, such as average, values to the central server. In this example, the time delay between the patient examination and the creation of the report may be a measure of the efficiency of a healthcare practitioner utilizing a respective computerized healthcare system with the efficiency potentially being dependent upon the manner in which the report is created.

As described above and as shown in FIG. 4, the computing device 20 embodied by the remote server 10 may repeat the forgoing process in accordance with a predefined schedule in order to determine if any additional sensors have been activated or if any existing sensors have been modified and then executing the currently activated sensors in accordance with a predefined schedule in order to obtain updated results regarding the health of the computerized healthcare systems.

Based upon the interaction of the central server 10 and the plurality of remote servers 12, the health of the computerized healthcare systems supported by the plurality of remote servers may be monitored in an efficient manner and maintenance activities may be identified and scheduled in a proactive manner so as to avoid or at least reduce instances in which the performance of the computerized healthcare system is degraded or in which an outage occurs. Additionally, by determining a healthcare score based on the results provided by a respective remote server, the method, apparatus, and computer program product of an example embodiment may provide an intuitive mechanism by which to evaluate the relative health of the remote servers and the computerized healthcare systems supported by the remote servers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    identifying one or more sensors to be downloaded and executed by a plurality of remote servers in order to provide for health monitoring of a computerized health care system by monitoring one or more characteristics that are informative regarding the ongoing operations of the computerized health care system, each sensor defined by a computer program module to be downloaded to and executed by one or more remote servers;
    receiving information indicating that a technician is aware of and working to resolve an issue with the computerized health care system;

receiving results of the health monitoring from the plurality of remote servers;

determining, with processing circuitry, a health score for a computerized health care system of a respective remote server based upon the results, the health score indicative of the computerized health care system being healthy or requiring maintenance, wherein determining the health score comprises determining the health score for the computerized health care system based at least in part upon the information indicating that the technician is aware of and working to resolve an issue with the computerized health care system, wherein the health score determined for the computerized health care system in an instance in which the technician is aware of and working to resolve the issue is different than the health score determined for the computerized health care system in an instance in which the technician is unaware of the issue; and causing a technician to be advised of the results and the health score.

2. A method according to claim 1 wherein determining the health score comprises:

determining a state of the computerized health care system based on a relationship between the results of the health monitoring and a plurality of candidate states for a respective type of health monitoring; and defining the health score based on the state of the computerized health care system.

3. A method according to claim 1 further comprising activating the one or more sensors to be downloaded to a respective remove server and responding to a query from a remote device regarding the one or more sensors that have been activated for the respective remote device.

4. A method according to claim 3, wherein activating the one or more sensors comprises associating a time with a respective sensor to define the time during which the respective sensor is to be active.

5. A computer program product comprising at least one non-transitory computer-readable storage medium having computer-executable program code instructions stored therein and configured, upon execution, to perform the method of claim 1.

6. An apparatus comprising processing circuitry configured to:

identify one or more sensors to be downloaded and executed by a plurality of remote servers in order to provide for health monitoring of a computerized health care system by monitoring one or more characteristics that are informative regarding the ongoing operations of the computerized health care system, each sensor defined by a computer program module to be downloaded to and executed by one or more remote servers;

receive information indicating that a technician is aware of and working to resolve an issue with the computerized health care system;

receive results of the health monitoring from the plurality of remote servers;

determining a health score for a computerized health care system of a respective remote server based upon the results, the health score indicative of the computerized health care system being healthy or requiring maintenance, wherein the processing circuitry is configured to determine the health core by determining the health score for the computerized health care system based at least in part upon the information indicating that the technician is aware of and working to resolve an issue with the computerized health care system, wherein the health score determined for the computerized health care system in an instance in which the technician is aware of and working to resolve the issue is different than the health score determined for the computerized health are system in an instance in which the technician is unaware of the issue; and cause a technician to be advised of the results and the health score.

7. An apparatus according to claim 6 wherein the processing circuitry s configured to determine the health score by:

determining a state of the computerized health care system based on a relationship between the results of the health monitoring and a plurality of candidate states for a respective type of health monitoring; and defining the health score based on the state of the computerized health care system.

8. An apparatus according to claim 6 wherein the processing circuitry is further configured to activate the one or more sensors to be downloaded to a respective remove server and to respond to a query from a remote device regarding the one or more sensors that have been activated for the respective remote device.

9. An apparatus according to claim 8, wherein the processing circuitry is configured to activate the one or more sensors by associating a time with a respective sensor to define the time during which the respective sensor is to be active.

10. A method comprising:

receiving a configuration file from a central server;

identifying one or more sensors that are to be deployed, each sensor defined by a computer program module;

downloading the one or more sensors;

entering a sleep mode following downloading of the one of more sensors in accordance with a predefined schedule that defines a time for executing the one or more sensors;

upon awakening from the sleep mode determining if one or more sensors for the computer health care system have changed since the one or more sensors have been downloaded and downloading one or more sensors that are determined to have changed;

executing, with a processing circuitry, the one or more sensors in accordance with a predefined schedule in order to provide for health monitoring of a computerized health care system, wherein the predefined schedule is defined by the configuration file received from the central server;

causing the results of the health monitoring to be provided to the central server for analysis; and repeating the identifying, downloading, executing and causing steps to permit additional sensors to be deployed by identifying, downloading and executing the additional sensors.

11. A computer program product comprising at least one non-transitory computer-readable storage medium having computer-executable program code instructions stored therein and configured, upon execution, to perform the method of claim 10.

12. An apparatus comprising processing circuitry configured to:

receive a configuration file from a central server;

identify one of more sensors that are to be deployed, each sensor defined by a computer program module;

download the one or more sensors;

enter a sleep mode following downloading of the one of more sensors in accordance with a predefined schedule that defines a time for executing the one or more sensors;

upon awakening from the sleep mode determine if one or more sensors for the computer health care system have changed since the one or more sensors have been downloaded and download one or more sensors that are determined to have changed;
execute the one or more sensors in accordance with a predefined schedule in order to provide for health monitoring of a computerized health care system, wherein the predefined schedule is defined by the configuration file received from the central server;
cause the results of the health monitoring to be provided to the central server for analysis; and
repeat the identifying, downloading, executing and causing steps to permit additional sensors to be deployed by identifying, downloading and executing the additional sensors.

* * * * *